United States Patent
Kojo

(10) Patent No.: US 8,782,457 B2
(45) Date of Patent: Jul. 15, 2014

(54) INFORMATION PROCESSING APPARATUS AND CONTROL METHOD THEREOF

(75) Inventor: Akihiro Kojo, Oume (JP)

(73) Assignee: Kabushiki Kaisha Toshiba, Tokyo (JP)

(*) Notice: Subject to any disclaimer, the term of this patent is extended or adjusted under 35 U.S.C. 154(b) by 212 days.

(21) Appl. No.: 13/291,610

(22) Filed: Nov. 8, 2011

(65) Prior Publication Data

US 2012/0192002 A1 Jul. 26, 2012

(30) Foreign Application Priority Data

Jan. 26, 2011 (JP) .................................. 2011-014601

(51) Int. Cl.
  *G06F 1/26* (2006.01)

(52) U.S. Cl.
  USPC .......................................... 713/330; 713/310

(58) Field of Classification Search
  USPC .......................................................... 713/324
  See application file for complete search history.

(56) References Cited

U.S. PATENT DOCUMENTS

| | | | | |
|---|---|---|---|---|
| 5,506,990 | A * | 4/1996 | Holman, Jr. ................... | 713/300 |
| 7,065,660 | B2 * | 6/2006 | Sanchez ........................ | 713/300 |
| 7,917,783 | B2 * | 3/2011 | Luo et al. ...................... | 713/310 |
| 2003/0074589 | A1 * | 4/2003 | Sanchez ........................ | 713/310 |
| 2006/0090090 | A1 * | 4/2006 | Perng ............................ | 713/320 |
| 2009/0187676 | A1 * | 7/2009 | Griffin et al. .................. | 710/14 |

FOREIGN PATENT DOCUMENTS

| | | |
|---|---|---|
| JP | 05-333773 | 12/1993 |
| JP | 07-036590 | 2/1995 |
| JP | 09-200330 | 7/1997 |
| JP | 2000-172960 | 6/2000 |
| JP | 2000-196740 | 7/2000 |
| JP | 2002-259027 | 9/2002 |
| JP | 2004-177687 | 6/2004 |
| JP | 2005-165479 | 6/2005 |
| JP | 2007-293775 | 11/2007 |

OTHER PUBLICATIONS

"Using your Treo™ 650 smartphone"; palmOne; 2004; pp. 154-156.*
Office Action received in Japanese Patent Application No. 2011-014601, dated Mar. 6, 2012, in 6 pages.
Office Action received in Japanese Patent Application No. 2011-014601, dated May 22, 2012, in 5 pages.
Office Action received in Japanese Patent Application No. 2012-183213, dated Jun. 11, 2013, in 5 pages.

* cited by examiner

*Primary Examiner* — Ryan Stiglic
(74) *Attorney, Agent, or Firm* — Knobbe, Martens, Olson & Bear LLP

(57) ABSTRACT

One embodiment provides an information processing apparatus, including: a main controller; a sub controller configured to supply power to the main controller; a first operation input module configured to issue an operation signal to cause the sub controller to start power supply to the main controller, in a power-off state; and a second operation input module configured to accept an operation input, wherein the sub controller is switchable into a forcibly locked state where the power supply to the main controller is not started in response to the operation signal, the sub controller being switchable into the forcibly locked state, according to the operation input from the second operation input module.

4 Claims, 5 Drawing Sheets

FIG. 4

| STATE | CONTROL CONTENTS |
|---|---|
| STATE A (POWER SWITCH IS FORCIBLY LOCKED) | (1) WHEN SPECIFIC INPUT a1 (MULTIFUNCTION BUTTON CONTINUES TO BE PRESSED FOR 4 SECONDS) IS MADE → TRANSITION TO STATE C<br>(2) WHEN SPECIFIC INPUT a2 (MULTIFUNCTION BUTTON IS PRESSED FOR 1 SECOND, RELEASED, AND THEN, PRESSED AGAIN FOR 1 SECOND) IS MADE → TRANSITION TO STATE A'<br>(3) WHEN POWER SWITCH IS PRESSED → STATE A IS MAINTAINED (POWER IS NOT TURNED ON) |
| STATE A' (FORCIBLE POWER SWITCH LOCKING IS TEMPORARILY RELEASED) | (1) WHEN POWER SWITCH IS PRESSED WITHIN PREDETERMINED TIME → TRANSITION TO POWER-ON STATE<br>(2) WHEN POWER SWITCH IS NOT PRESSED WITHIN PREDETERMINED TIME → TRANSITION TO STATE A |
| STATE B (POWER SWITCH LOCKING IS PERMITTED) | (1) WHEN SPECIFIC INPUT b1 (MULTIFUNCTION BUTTON CONTINUES TO BE PRESSED FOR 4 SECONDS) IS MADE → TRANSITION TO STATE A<br>(2) WHEN MOVEMENT IS DETECTED BY ACCELERATION SENSOR → TRANSITION TO STATE A<br>(3) WHEN POWER SWITCH IS PRESSED → TRANSITION TO POWER-ON STATE |
| STATE C (POWER SWITCH LOCKING IS INHIBITED) | (1) POWER SWITCH IS PRESSED → TRANSITION TO POWER-ON STATE |

INFORMATION PROCESSING APPARATUS AND CONTROL METHOD THEREOF

CROSS-REFERENCE TO RELATED APPLICATION(S)

This application claims priority from Japanese Patent Application No. 2011-014601 filed on Jan. 26, 2011, the entire contents of which are incorporated herein by reference.

FIELD

Embodiments described herein relate generally to an information processing apparatus and a control method thereof.

BACKGROUND

In recent years, information processing apparatuses in which operation switches are exposed, most notably a straight type, have emerged. In such information apparatuses, an operation switch provided so as to be exposed may be erroneously pressed, and an operation not intended by the user may be performed.

To prevent such a misoperation of an operation switch, various proposals have been made. For example, there is proposed a personal computer, in which a console panel that can be operated in the lid-closed state is provided and the input of the console switch is inhibited when a key locking switch provided on the console switch is pressed.

In such personal computers, locking mechanisms constituted by hardware are generally used for preventing misoperation of operation switches exposed on the surface of the apparatus. There is a demand for controlling the power switch in power-off state without any addition of hardware from the standpoint of reduction in mounting area due to the downsizing of apparatuses and cost.

BRIEF DESCRIPTION OF DRAWINGS

A general architecture that implements the various feature of the present invention will now be described with reference to the drawings. The drawings and the associated descriptions are provided to illustrate embodiments and not to limit the scope of the present invention.

FIG. 4 illustrates a table showing the correspondence between the power switch locking states of the computer 1 and the control contents in the states in the embodiment.

DETAILED DESCRIPTION

In general, one embodiment provides an information processing apparatus, including: a main controller; a sub controller configured to supply power to the main controller; a first operation input module configured to issue an operation signal to cause the sub controller to start power supply to the main controller, in a power-off state; and a second operation input module configured to accept an operation input, wherein the sub controller is switchable into a forcibly locked state where the power supply to the main controller is not started in response to the operation signal, the sub controller being switchable into the forcibly locked state, according to the operation input from the second operation input module.

Hereinafter, the embodiment will be described with reference to the drawings.

Figure 1:
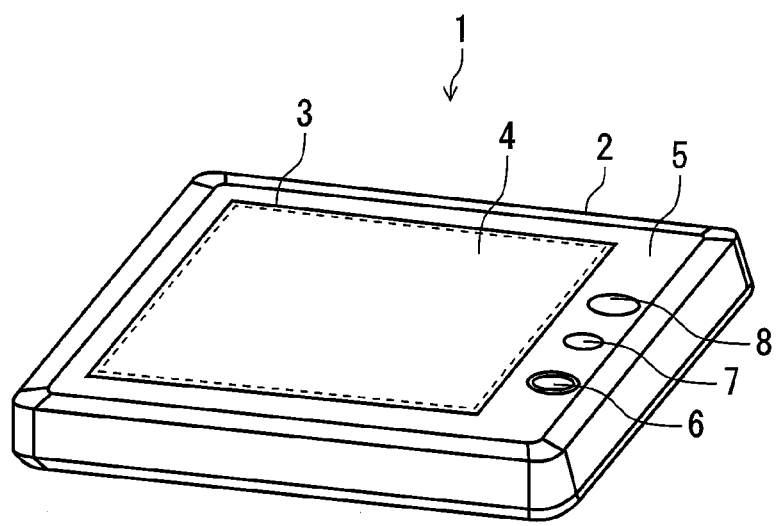
FIG. 1 illustrates a computer in the embodiment.

FIG. 1 illustrates an appearance of an information processing apparatus according to the embodiment. This information processing apparatus is implemented, for example, as a battery-driven computer 1.

The computer 1 has a flat rectangular shape as shown in FIG. 1. On the computer 1, an LCD (liquid crystal display) 3 as a display portion, a power switch 6, an LED 7 and a multifunction button 8 are provided so as to be exposed on a surface 5 of a housing 2. An acceleration sensor 9 is provided inside the housing 2 so as to detect a movement of the computer 1. A transparent touch panel 4 is provided on the top surface of the LCD 3, and a touch screen display is realized by the LCD 3 and the touch panel 4. This touch screen display detects a touch area (also referred to as touch position) on the display screen touched by a pen or a finger. The user performs various operations by operating the touch panel 4, the power switch 6 and the multifunction button 8.

The power switch 6 is provided so as to be exposed on the surface 5 of the housing 2, and accepts an operation input to turn on and off the power to the computer 1.

The LED 7 emits light to notify the user of the operating state of the computer 1. The LED 7 is capable of indicating various operating states by switching the color of the light or between on and off states.

The multifunction button 8 is assigned with a given function, and can be used for setting and releasing power switch locking, for example.

Figure 2:
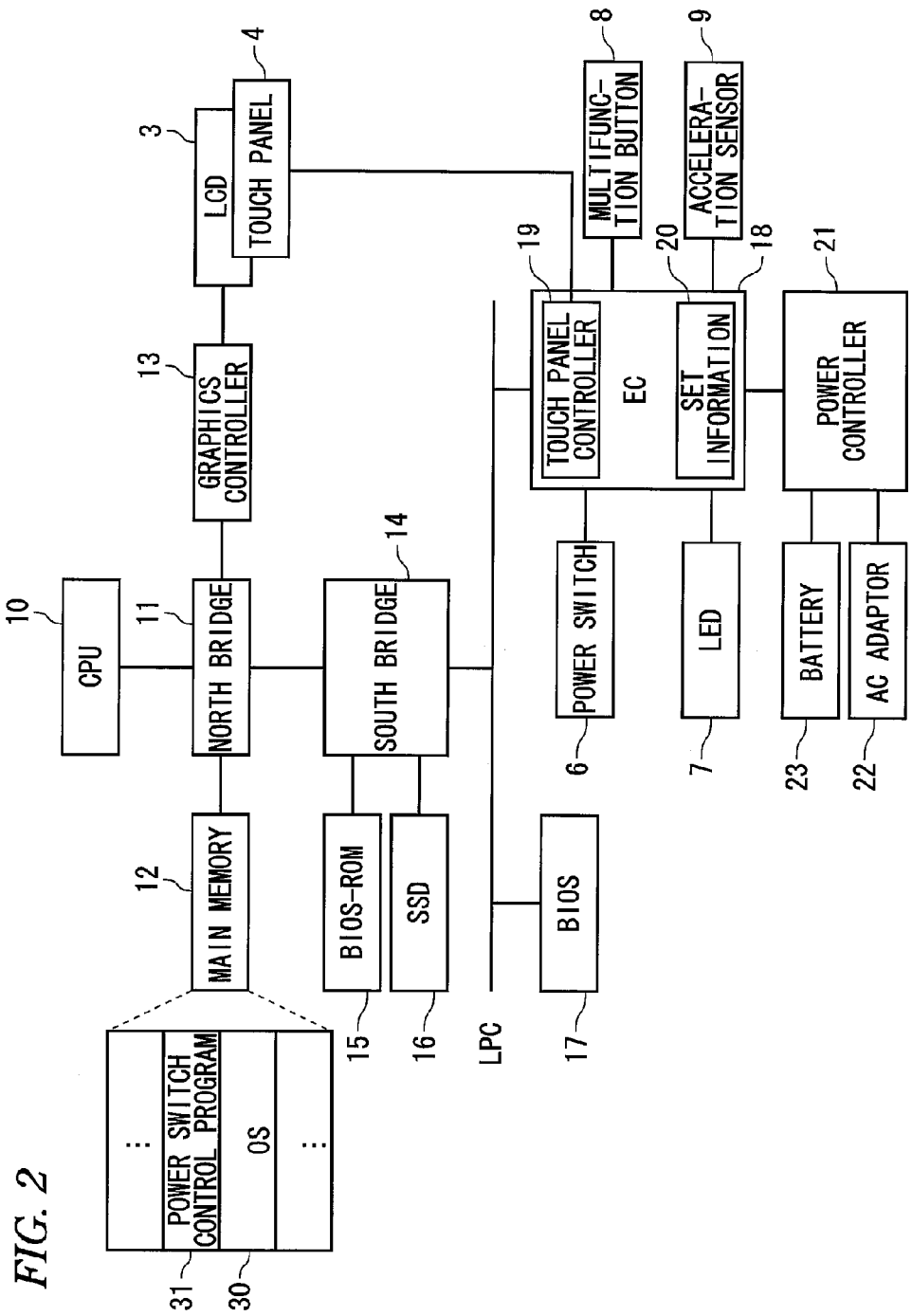
FIG. 2 illustrates a system configuration of the computer in the embodiment.

FIG. 2 illustrates a system configuration of the computer 1 in the embodiment.

The computer 1 is provided with a CPU (central processing unit) 10, a north bridge 11, a main memory 12, a graphics controller 13, a south bridge 14, a BIOS-ROM (basic input/output system-read only memory) 15, an SSD (solid state drive) 16, a BIOS 17 and an embedded controller (EC) 18.

The CPU 10 controls the operation of the computer 1, and executes various application programs and the like such as an operating system (OS) 30 read from the SSD 16 to the main memory 12 and a power switch control program 31.

By executing the power switch control program 31, the CPU 10 can set/release the power switch locking state or set a specific input for making a transition between power switch states. The set information is stored in set information 20 in the embedded controller (EC) 18.

The CPU 10 also has the function of executing a system BIOS stored in the BIOS-ROM 15. The system BIOS is a program for controlling the hardware of the computer 1.

The north bridge 11 is a bridge device that connects between a local bus of the CPU 10 and the south bridge 14. The north bridge 11 incorporates a memory controller that controls access to the main memory 12.

The main memory 12 is a temporary storage area into which the OS 30 and the applications executed by the CPU 10 are read. Into the main memory 12, programs such as the OS 30 and the power switch control program 31 stored in the SSD 16 are read.

The graphics controller 13 is a display controller that controls the LCD 3 used as the display of the computer 1. The graphics controller 13 executes display processing (graphics arithmetic processing) for rendering display data in a video memory (VRAM) based on a rendering request inputted from the CPU 10 through the north bridge 11. In the video memory, the display data corresponding to the screen image displayed on the LCD 3 is stored.

The south bridge 14 incorporates an IDE (integrated drive electronics) controller for controlling the SSD 16 and a serial ATA controller.

The embedded controller (EC) 18 has the function of turning on/off the power to the computer 1 in response to the user's operation of the power switch 6. The embedded controller (EC) 18 includes a touch panel controller 19 that controls the touch panel 4 provided on the LCD 3.

The touch panel (touch screen display) 4 is configured to detect the touch area (touch position) thereon, for example, by using the resistive method or the capacitive method.

The embedded controller (EC) 18 stores the set information 20 related to the control of the power switch locking state. Since the embedded controller (EC) 18 is always operating irrespective of whether the power to the computer 1 is on or off, even when the power to the computer 1 is turned off, the control of the power switch locking state can be executed based on the set information 20. That is, upon detection of the inputs from the touch panel 4, the power switch 6, the multifunction button 8 and the acceleration sensor 9 with reference to the current power switch locking state and control contents stored in the set information 20, the embedded controller (EC) 18 controls the power switch locking state by software.

When external power is supplied through an AC adaptor 22, a power controller 21 generates system power to be supplied to each component of the computer 1 from the supplied external power. When no external power is supplied through the AC adaptor 22, the power controller 21 generates the system power from a power of a battery 23.

The power controller 21 is controlled by the embedded controller (EC) 18. Upon detection of an operation signal to instruct the power on in the power-off state, the embedded controller (EC) 18 determines whether the power switch 6 is locked or not with reference to the set information 20. When it is determined that the power switch 6 is locked, the embedded controller (EC) 18 does not control the power controller 21. When it is determined that the power switch 6 is not locked, the embedded controller (EC) 18 controls the power controller 21 so as to turn the power on.

For example, notification as to whether the power switch is locked or not is provided to the user by changing the color of the light of the LED 7 or providing display on the touch panel 4.

Figure 3:
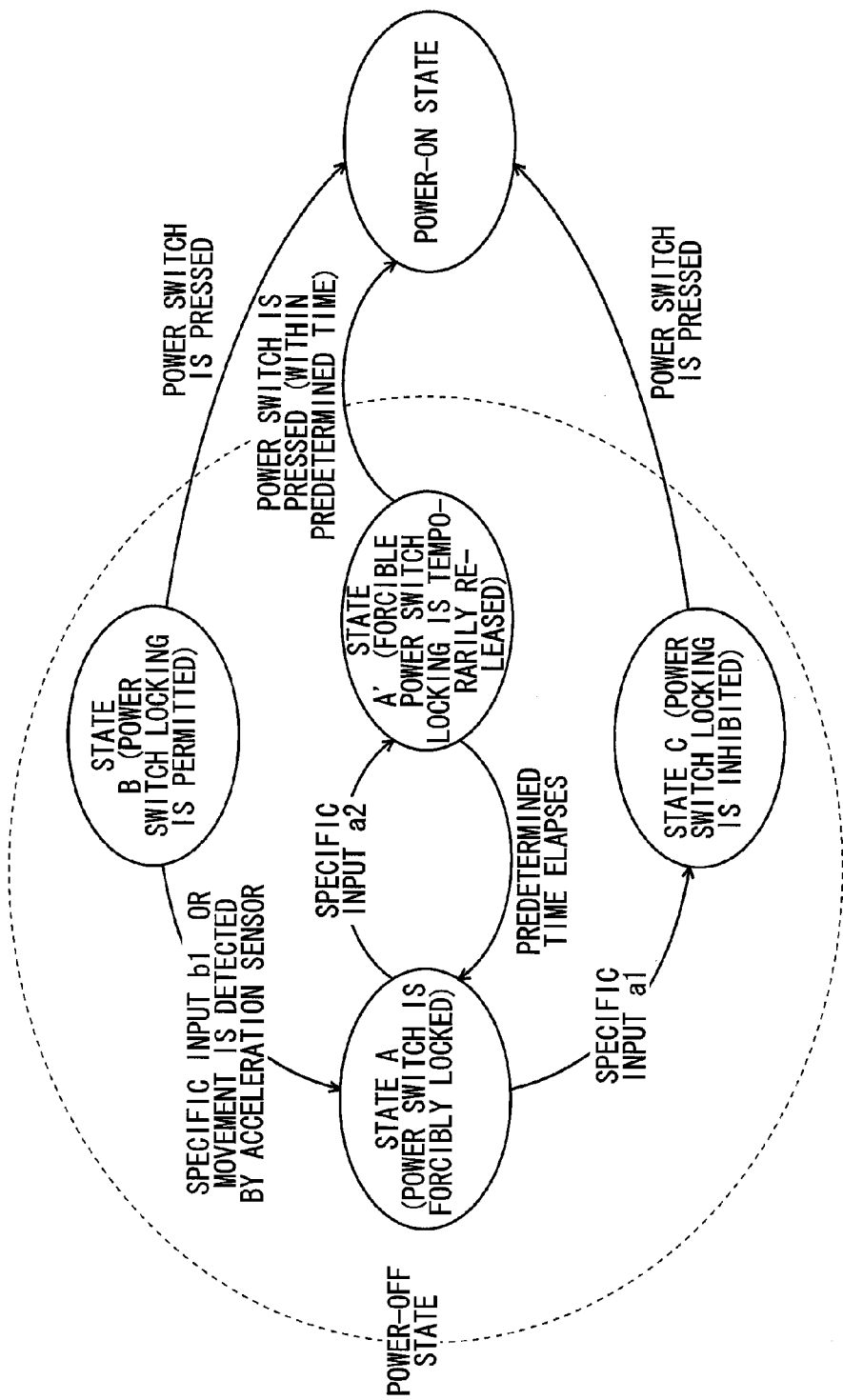
FIG. 3 illustrates the transition of the power switch locking state of the computer in the embodiment.

FIG. 3 illustrates the transition of the power switch locking state of the computer in the embodiment.

The power state of the computer 1 is broadly divided into power-on state and power-off state. And, the computer 1 in the embodiment has four states of a state A, a state A', a state B and a state C as the power-off state.

The state A is a power switch forcibly locked state in which a transition is not made to the power-on state even if the power switch 6 is pressed. In the state A, when a specific input a1 is made, a transition is made to the state C, and when a specific input a2 is made, a transition is made to the state A'. For example, the specific input a1 is an input of continuing to press the multifunction button 8 for four seconds, and the specific input a2 is an input of pressing the multifunction button 8 for one second, releasing it and pressing it again.

The above specific inputs are merely examples, and may be different operation inputs by the multifunction button 8. Inputs may be provided from a different input device such as the touch panel 4. For example, the computer 1 may be configured to allow a password input by selecting the symbols/numbers displayed on the touch screen display and the release of the power switch locking by drawing a specific figure on the touch panel 4.

A combination of the inputs of the multifunction button 8 and the touch panel 4, such as an input of inputting a password on the touch panel 4 while pressing the multifunction button 8, may be used as the specific inputs. The specific inputs may be preset or may be settable/changeable by the user.

The state A' is a power switch locking temporarily released state. That is, when the power switch 6 is pressed within a predetermined time under a condition where a transition is made to the state A', a transition is made to the power-on state. On the other hand, when the power switch 6 is not pressed within the predetermined time, a return is made to the state A.

The state B is a power switch locking permitted state, and when a specific input b1 of the multifunction button 8 is detected or a movement of the computer 1 is detected by the acceleration sensor 9, a transition to the power switch forcibly locked state of the state A can be made. For example, the specific input b1 is an input of continuing to press the multifunction button 8 for four seconds. Moreover, in the state B, since the power switch is not locked, when the power switch 6 is pressed in the state B, a transition is made to the power-on state.

The state C is a power switch locking inhibited state in which it is impossible to lock the power switch. That is, when the specific input a1 of the multifunction button 8 is made from the state A, a return to the state A cannot be made. And, when the power switch 6 is pressed in the state C, a transition is made to the power-on state.

FIG. 4 illustrates a table showing the correspondence between the power switch locking states of the computer 1 and the control contents in the states in the embodiment. This correspondence table is stored in the set information 20 together with the current power switch locking state of the computer 1.

The computer 1 has the four states of the state A, the state A', the state B and the state C as the power-off state.

A first control in the state A is to make a transition to the state C when the specific input a1 is made. That is, when the specific input a1 is made in the power switch forcibly locked state (state A), a transition is made to the power switch locking inhibited state (state C).

A second control in the state A is to make a transition to the state A' when the specific input a2 is made. That is, when the specific input a2 is made in the power switch forcibly locked state (state A), a transition is made to the power switch locking temporarily released state (state A').

A third control in the state A is to maintain the state A when the power switch 6 is pressed. That is, the power is not turned on even when the power switch 6 is pressed in the power switch forcibly locked state (state A).

A first control in the state A' is to make a transition to the power-on state when the power switch 6 is pressed within the predetermined time. That is, in the state in which forcible power switch locking is temporarily released (state A'), when the power switch 6 is operated within the predetermined time to instruct the power on, power supply is started in response to the operation signal.

A second control in the state A' is to make a transition to the state A when the power switch 6 is not pressed within the predetermined time. That is, since the inhibition of power switch locking by the specific input a2 is only temporal unlike that by the specific input a1, a return is made to the original state A after the elapse of the predetermined time.

A first control in the state B is to make a transition to the state A when the specific input b1 is made. That is, when the specific input b1 is made in the power switch locking permitted state (state B), a transition is made to the power switch forcibly locked state (state A).

A second control in the state B is to make a transition to the state A when a movement of the computer 1 is detected by the acceleration sensor 9. That is, when a movement of the computer 1 is detected in the power switch locking permitted state (state B), a transition is made to the power switch forcibly locked state (state A).

A third control in the state B is to make a transition to the power-on state when the power switch 6 is pressed. That is, when the power switch 6 is pressed in the power switch locking permitted state (state B), since the power switch 6 is not locked, in response to the operation signal to instruct power supply start transmitted from the power switch 6, the power controller 21 is controlled to make a transition to the power-on state.

A control in the state C is to make a transition to the power-on state when the power switch 6 is pressed. That is, when the power switch 6 is pressed in the power switch locking inhibited state (state C), since the power switch 6 is not locked, in response to the operation signal to instruct power supply start transmitted from the power switch 6, the power controller 21 is controlled to make a transition to the power-on state.

Figure 5:
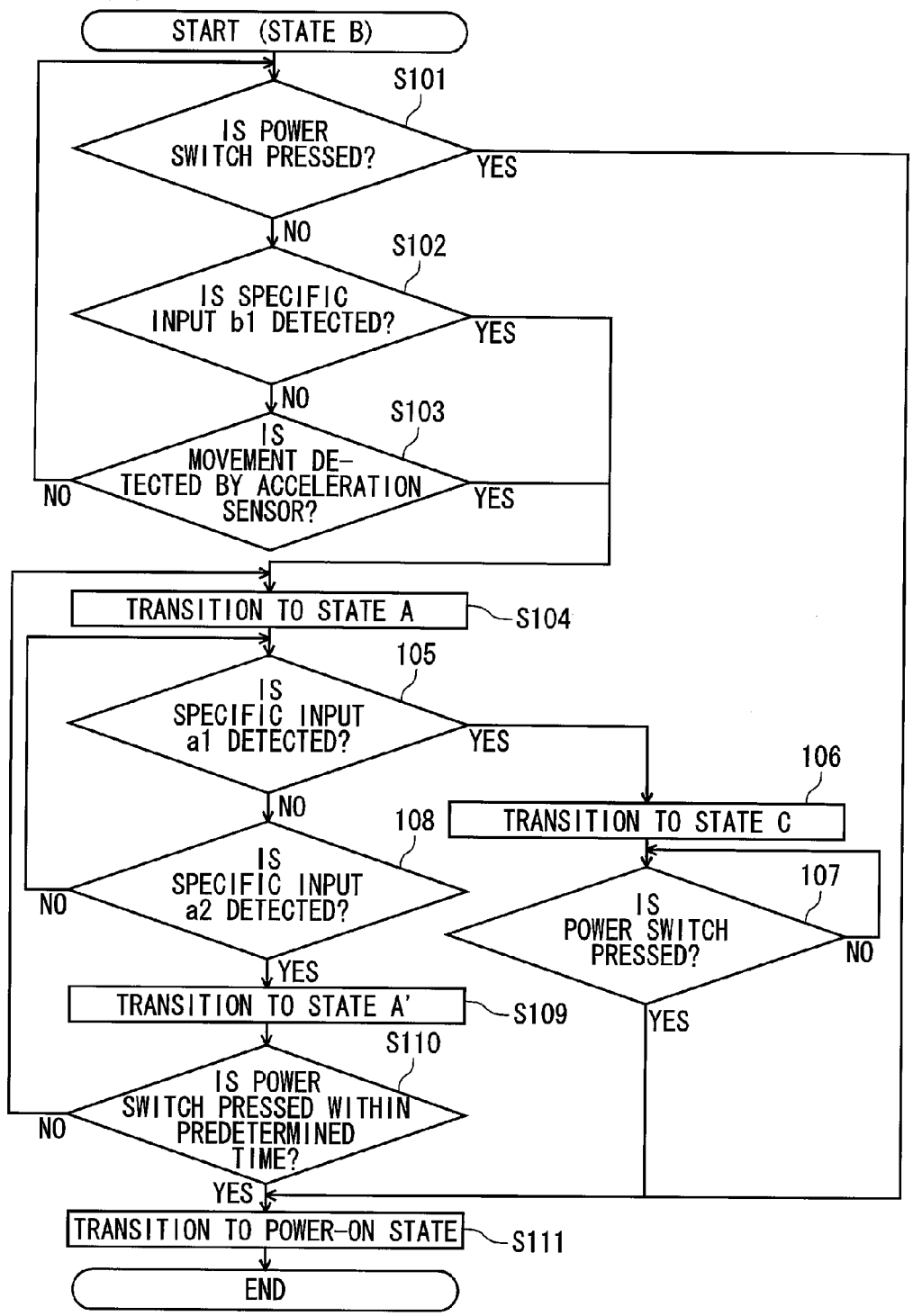
FIG. 5 illustrates the procedure of control of the power switch locking state of the computer 1 in the embodiment.

FIG. 5 illustrates the procedure of control of the power switch locking state of the computer 1 in the embodiment. In FIG. 5, starting with the state B, the transition of the power switch locking state will be described.

First, the embedded controller (EC) 18 determines whether the power switch 6 is pressed or not (step S101). When the embedded controller (EC) 18 determines that the power switch 6 is pressed as a result of the determination at step S101 (Yes of step S101), a transition is made to the power-on state (step S111). On the other hand, when the embedded controller (EC) 18 determines that the power switch 6 is not pressed as a result of the determination at step S101 (No of step S101), it determines whether the specific input b1 is made or not (step S102).

When the embedded controller (EC) 18 determines that the specific input b1 is made as a result of the determination at step S102 (Yes of step S102), a transition is made to the state A (step S104). On the other hand, when the embedded controller (EC) 18 determines that the specific input b1 is not made as a result of the determination at step S102 (No of step S102), it then determines whether a movement of the computer 1 is detected by the acceleration sensor 9 or not (step S103).

When the embedded controller (EC) 18 determines that no movement is detected as a result of the determination at step S103 (No of step S103), the process returns to step S101. When the embedded controller (EC) 18 determines that a movement is detected as a result of the determination at step S103 (Yes of step S103), a transition is made to the state A (step S104).

Then, when a transition is made to the state A (step S104), the embedded controller (EC) 18 determines whether the specific input a1 is made or not (step S105). When the embedded controller (EC) 18 determines that the specific input a1 is made as a result of the determination at step S105 (Yes of step S105), a transition is made to the state C (step S106). Then, the embedded controller (EC) 18 determines whether the power switch 6 is pressed or not (step S107). When the embedded controller (EC) 18 determines that the power switch 6 is not pressed as a result of the determination at step S107 (No of step S107), the process returns to step S107. That is, the state C is maintained until the power switch 6 is pressed. On the other hand, when the embedded controller (EC) 18 determines that the power switch 6 is pressed as a result of the determination at step S107 (Yes of step S107), a transition is made to the power-on state (step S111).

When the embedded controller (EC) 18 determines that the specific input a1 is not made as a result of the determination at step S105 (No of step S105), it determines whether the specific input a2 is made or not (step S108). When the embedded controller (EC) 18 determines that the specific input a2 is not made as a result of the determination at step S108 (No of step S108), the process shifts to step S105. On the other hand, when the embedded controller (EC) 18 determines that the specific input a2 is made as a result of the determination at step S108 (Yes of step S108), a transition is made to the state A' (step S109).

Then, the embedded controller (EC) 18 determines whether the power switch 6 is pressed within the predetermined time or not (step S110). When the embedded controller (EC) 18 determines that the power switch 6 is not pressed within the predetermined time as a result of the determination at step S110 (No of step S110), a transition is made to the state A (the process returns to step S104). On the other hand, when the embedded controller (EC) 18 determines that the power switch 6 is pressed within the predetermined time as a result of the determination at step S110 (Yes of step S110), a transition is made to the power-on state (step S111). With this, the procedure of control of the power switch locking state is ended.

As described above, according to the embodiment, the power switch 6 can be controlled while the power of the computer 1 is off. That is, switching between locking and unlocking of the power switch is realized without any addition of hardware by controlling the power switch 6 with software by the embedded controller (EC) 18 that operates even while the power of the computer 1 is off. The embodiment can be applied to small-size information processing apparatuses with limited mounting areas, and cost is not increased. Moreover, by suppressing unintentional power-on, power can be saved, and the security of information processing apparatuses can be improved.

While some embodiments have been described, these embodiments are presented as examples, and are not intended to limit the scope of the invention. These novel embodiments may be realized in various other forms, and various omissions, replacements and changes may be made without departing from the scope of the invention. These embodiments and variations thereof will fall within the scope of the invention described in the claims and equivalent thereto.

The invention claimed is:

1. An information processing apparatus, comprising:
   a main controller;
   a sub controller configured to operate among:
      a power-on state in which the sub controller is configured to supply power to the main controller; and
      a power-off state in which the sub controller is configured to refrain from supplying power to the main controller, the power-off state comprising:
         a first power-off state in which the sub controller is configured to enter the power-on state when the sub controller receives a first operation final (power on signal);
         a second power-off state in which the sub controller is configured to:
            refrain from entering the power-on state when the sub controller receives the first operation signal; and
            enter the third power-off state when the sub controller receives a second operation signal; and a third power-off state in which the sub controller is configured to:
    enter the power-on state when the sub controller receives the first operation signal within a first time period from when the sub controller has entered the third power-off state; and
    enter the second power-off state when the sub controller does not receive the first operation signal within the first time period;
a first operation input module configured to issue the first operation signal; and
a second operation input module configured to issue the second operation signal.

2. The apparatus of claim 1,
wherein the second operation input module is further configured to issue a third operation signal, and
the sub controller is further configured to enter the first power-off state when the sub controller receives the third operation signal while in the second power-off state.

3. The apparatus of claim 1,
wherein the sub controller is further configured to enter a fourth power-off state in which the sub controller is configured to:
    enter the power-on state when the sub controller receives the first operation signal; and
    refrain from entering the second power-off state.

4. A method of controlling an information processing apparatus, comprising:
operating the apparatus among:
    a power-on state in which a sub controller is configured to supply power to a main controller; and
    a power-off state in which the sub controller is configured to refrain from supplying power to the main controller, the power-off state comprising:
        a first power-off state in which the sub controller is configured to enter the power-on state when the sub controller receives a first operation final (power on signal);
        a second power-off state in which the sub controller is configured to:
        refrain from entering the power-on state when the sub controller receives the first operation signal; and
        enter the third power-off state when the sub controller receives a second operation signal; and
        a third power-off state in which the sub controller is configured to:
            enter the power-on state when the sub controller receives the first operation signal within a first time period from when the sub controller has entered the third power-off state; and
            enter the second power-off state when the sub controller does not receive the first operation signal within the first time period;
issuing the first operation signal operative to cause the sub controller to start power supply to the main controller, in a power-off state; and
issuing the second operation signal.

* * * * *